(12) United States Patent
Horiuchi et al.

(10) Patent No.: US 7,027,121 B2
(45) Date of Patent: Apr. 11, 2006

(54) METHOD FOR MANUFACTURING LIQUID CRYSTAL DISPLAY DEVICE HAVING THE FIRST SUBSTRATE AND SUPPORT SUBSTRATE PRESSED AGAINST EACH OTHER UNDER VACUUM CONDITION WITHOUT USE OF AN ADHESIVE

(75) Inventors: Toshihiro Horiuchi, Izumi (JP); Yoshikazu Noiri, Izumi (JP); Hidefumi Yoshizoe, Izumi (JP); Shinji Ueebisu, Izumi (JP); Toshiaki Mukai, Izumi (JP)

(73) Assignee: NEC LCD Technologies, Ltd., (JP)

( * ) Notice: Subject to any disclaimer, the term of this patent is extended or adjusted under 35 U.S.C. 154(b) by 115 days.

(21) Appl. No.: 10/620,125

(22) Filed: Jul. 15, 2003

(65) Prior Publication Data

US 2005/0024580 A1    Feb. 3, 2005

(30) Foreign Application Priority Data

Jul. 18, 2002 (JP) .............................. 2002-210201

(51) Int. Cl.
*G02F 1/13* (2006.01)
(52) U.S. Cl. ..................... 349/187; 349/45; 349/158
(58) Field of Classification Search ........ 349/187–189, 349/158, 123–126
See application file for complete search history.

(56) References Cited

U.S. PATENT DOCUMENTS

| 5,592,288 | A | * | 1/1997 | Sampica et al. | ............... 356/62 |
| 5,929,962 | A | * | 7/1999 | Chiu et al. | ................... 349/187 |
| 2001/0040644 | A1 | * | 11/2001 | Vu et al. | ....................... 349/42 |

FOREIGN PATENT DOCUMENTS

JP    2001-125082    5/2001

* cited by examiner

*Primary Examiner*—Andrew Schechter
*Assistant Examiner*—(Nancy) Thanh-Nhan P. Nguyen
(74) *Attorney, Agent, or Firm*—Hayes Soloway P.C.

(57) ABSTRACT

At least one out of two substrates constituting a liquid crystal display device is formed from a plastic substrate. When attaching the plastic substrate to an opposing substrate that is disposed to face the plastic substrate, the plastic substrate and the support substrate are attached to each other without interposing an adhesive therebetween. That is, the plastic substrate is pressed against and attached to the support substrate under vacuum conditions. This prevents air from entering between the plastic substrate and the support substrate. Accordingly, the plastic substrate is able to maintain its flatness and therefore, the two substrates are spaced a uniform distance apart from each other, i.e., fabricated to maintain a constant cell gap therebetween as desired even after the plastic substrate and the opposing substrate are attached to each other via the sealing material.

9 Claims, 4 Drawing Sheets

METHOD FOR MANUFACTURING LIQUID CRYSTAL DISPLAY DEVICE HAVING THE FIRST SUBSTRATE AND SUPPORT SUBSTRATE PRESSED AGAINST EACH OTHER UNDER VACUUM CONDITION WITHOUT USE OF AN ADHESIVE

BACKGROUND OF THE INVENTION

1. Field of the Invention

The present invention relates to a method for manufacturing a liquid crystal display device, and particularly to a method for manufacturing a liquid crystal display device incorporating therein a plastic substrate as a substrate thereof.

2. Description of the Related Art

A plastic substrate has been considered a promising substrate material for compact, thin and low cost liquid crystal display device. Japanese Patent Application No. 13(2001)-125082 discloses a method for manufacturing a liquid crystal panel employing therein such a plastic substrate. The plastic substrate employed in the liquid crystal display device disclosed in the publication will be briefly explained with reference to FIGS. 1A through 2B.

As shown in FIG. 1A, first, a thermally activatable adhesive 212 attached with a removable film 211 is pressed against and attached to a support substrate 203 using a roller. Then, as shown in FIG. 1B, the removable film 211 is peeled off from the thermally activatable adhesive 212 attached to the support substrate 203. Furthermore, as shown in FIG. 1C, a plastic substrate 201 having a transparent electrode 213 formed on the surface of the substrate is adhesively attached using a roller 215 to the support substrate 203 via the thermally activatable adhesive 212.

The inventors of this application identified the following problems occurred when the plastic substrate fabricated as described above is handled in actual manufacturing steps.

Referring to a side view shown in FIG. 2A, air 214 enters between the thermally activatable adhesive 212 and the plastic substrate 201. Even when trying to pull out the air left between the thermally activatable adhesive 212 and the plastic substrate 201, the adhesive 212 blocks a passage along which the air escapes to the outside and therefore, air is always left between the adhesive 212 and substrate 201. Thereafter, the plastic substrate 201 supported by the support substrate 203 is rinsed with pure water and chemical solution, and then dried at a temperature of 130–170°C. Then, an alignment material, heated at low processing temperatures, is applied to the transparent electrode 213 on the plastic substrate 201 by printing techniques and heated at a temperature of 80–180°C. Subsequently, the heated alignment material is rubbed to form an alignment film and rinsed with pure water, and then dried at a temperature of 130–170°C.

The plastic substrate 201, having been subjected to the aforementioned heat treatment, is deformed because the air 214 thermally expands and grows into a large bubble. In some cases, the plastic substrate 201 is broken by expansion of bubble.

Moreover, as shown in FIG. 2B, an adhesive sealing material 204, provided as an thermally cured adhesive and having a specific patterns is formed on the surface (on the side of an alignment film) of the plastic substrate 201, which is supported by the support substrate 203, by screen printing techniques or dispensing techniques. Then, a TFT substrate 251 having spacers (not shown) dispersed on the surface thereof and the plastic substrate 201 supported by the support substrate 203 are attached together along the edge with the adhesive sealing material 204 and the two substrates are pressed against each other, and further, heated for 1 to 2 hours at a temperature of 120–160°C., resulting in their attachment.

The two substrates, attached to each other as described above, encounter a situation in which a cell gap between the two substrates becomes non-uniform, i.e., the adhesive sealing material is displaced from its original position or the plastic substrate is subject to breakage. This is because variations in the extent to which the thermally activatable adhesive 212 is adhesively attached to the plastic substrate occur and/or the air 214 left between the thermally activatable adhesive 212 and the plastic substrate 201 and subjected to heat treatments in the step of sintering the sealing material, expands resulting in the deformation and/or flexure of plastic substrate. Furthermore, the fact that the amount of expansion or shrinkage of plastic substrate 201 is larger than that of the support substrate 203 at high processing temperatures (i.e., during sintering of sealing material) also contributes to deformation and/or flexure of plastic substrate. In other words, the adhesion force of the thermally activatable adhesive 212 provided to the plastic substrate 201 cannot suppress expansion or shrinkage of plastic substrate.

Moreover, since the plastic substrate, constructed as described above, has the thermally activatable adhesive attached thereto, it needs to be processed through time-consuming steps including an attachment step and a peeling step. Thereby, the number of process steps is increased.

SUMMARY OF THE INVENTION

An object of the present invention is to provide a method for manufacturing a liquid crystal display device that incorporates a plastic substrate that is deformation and/or flexure free and does not cause a non-uniformity in a cell gap between two substrates when the two substrates are attached to each other.

A method for manufacturing a liquid crystal display device according to the invention comprises: a step of pressing a first substrate and a support substrate against each other under vacuum conditions; a step of breaking the vacuum conditions and transferring the first substrate and the support substrate into an external atmospheric pressure environment while keeping the first substrate and the support substrate being pressed against each other to attach the first substrate and the support substrate to each other; a step of disposing the first substrate pressed against and attached to the support substrate and a second substrate so that the first substrate and the second substrate are aligned with each other while interposing a sealing material therebetween; and a step of curing the sealing material to attach the first substrate and the second substrate to each other via the sealing material.

The method for manufacturing a liquid crystal display device according to the invention is further constructed such that the step of pressing a first substrate and a support substrate against each other under vacuum conditions is performed by pressing the first substrate and the support substrate against each other so that a surface of an alignment film formed on the first substrate and a roughened surface previously formed on a press tool are disposed to face each other.

The method for manufacturing a liquid crystal display device according to the invention further comprises a step of removing the support substrate from the first substrate after the step of curing the sealing material to attach the first substrate and the second substrate to each other, in which the step of removing the support substrate from the first substrate is performed by threading a thin strip between the first substrate and the support substrate.

The method for manufacturing a liquid crystal display device according to the invention further comprises a step of injecting a liquid crystal material into a space enclosed by the first substrate, the second substrate and the sealing material after the step of removing the support substrate from said first substrate.

DETAILED DESCRIPTION OF THE PREFERRED EMBODIMENTS

An illustrative embodiment of a method for manufacturing a liquid crystal display device according to the present invention will be explained in the order of process steps with reference to cross sectional views shown in FIGS. 3A, 3B, 4A, 4B, 5A and 5B.

First, a plastic substrate 1 having an insulation film and an ITO film formed in order thereon and having a thickness of 0.05 to 0.2 mm is prepared. When taking into account the situation in which the plastic substrate is to be attached to a support substrate in a subsequent step, the plastic substrate needs to have a smooth surface and therefore, is preferably made of polycarbonate (PC) or polyethersulfone (PES). The plastic substrate 1 is used as an opposing substrate disposed opposite an active matrix substrate (TFT substrate) in a liquid crystal display device. Accordingly, the plastic substrate of the embodiment may be configured to have color filters formed underneath the insulation film.

Thereafter, the plastic substrate 1 is rinsed with pure water and chemical solution, and then dried at a temperature of 130–170°C. Then, an alignment material that is to be heated at low processing temperatures is applied to the ITO film on the plastic substrate 1 by printing techniques and heated at a temperature of 80–180°C. Subsequently, the heated alignment material is rubbed to form an alignment film 2 and rinsed with pure water, and then dried at a temperature of 130–170°C.

Figure 1A:
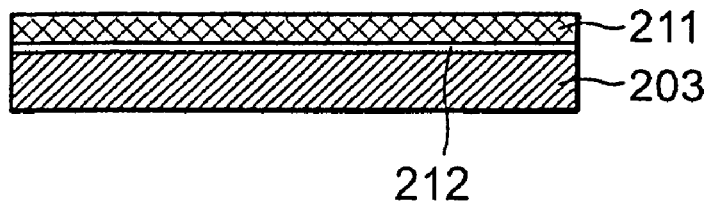
FIG. 1A is a side view illustrating how a conventional liquid crystal display device is manufactured in the order of process steps in a case where a liquid crystal display device employs a plastic substrate as one of two opposing substrates.
Figure 1B:
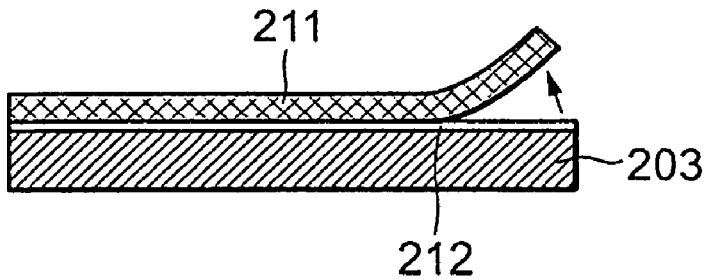
FIG. 1B is a side view illustrating the step subsequent to the step shown in FIG. 1A.
Figure 1C:
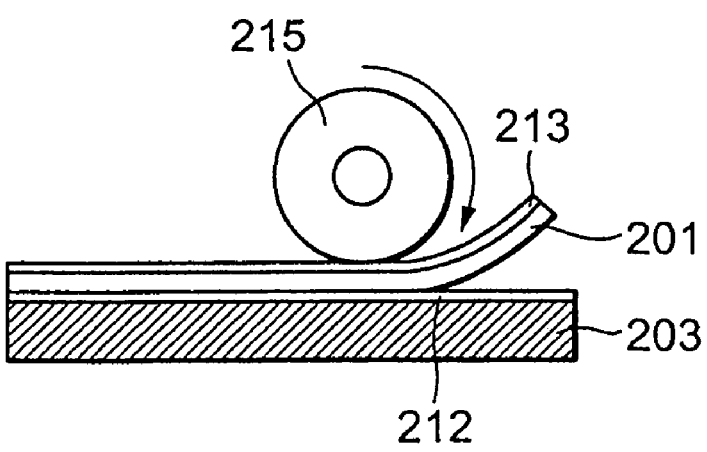
FIG. 1C is a side view illustrating the step subsequent to the step shown in FIG. 1B.
Figure 2A:
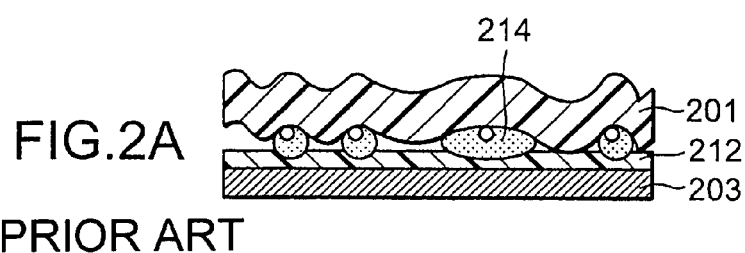
FIG. 2A is an enlarged side view illustrating a situation in which air bubble is left between the plastic substrate and an adhesive, and showing the step subsequent to the step shown in FIG. 1C.
Figure 2B:
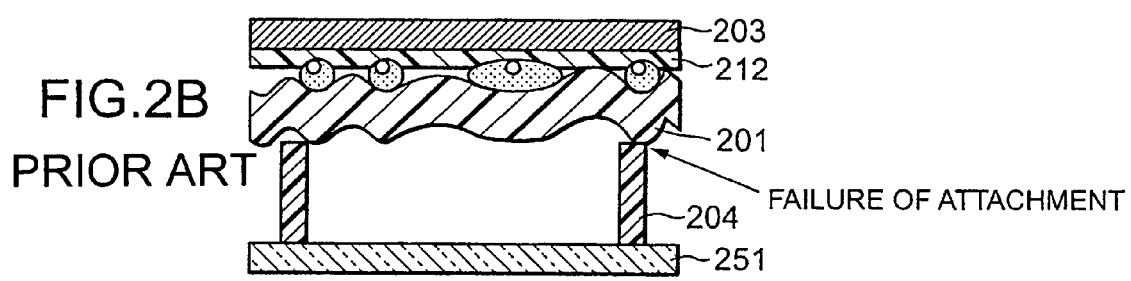
FIG. 2B is a side view illustrating a situation in which a TFT substrate and the plastic substrate supported by the support substrate are attached together along the edge with the adhesive sealing material, and showing the step subsequent to the step shown in FIG. 1C.
Figure 3A:
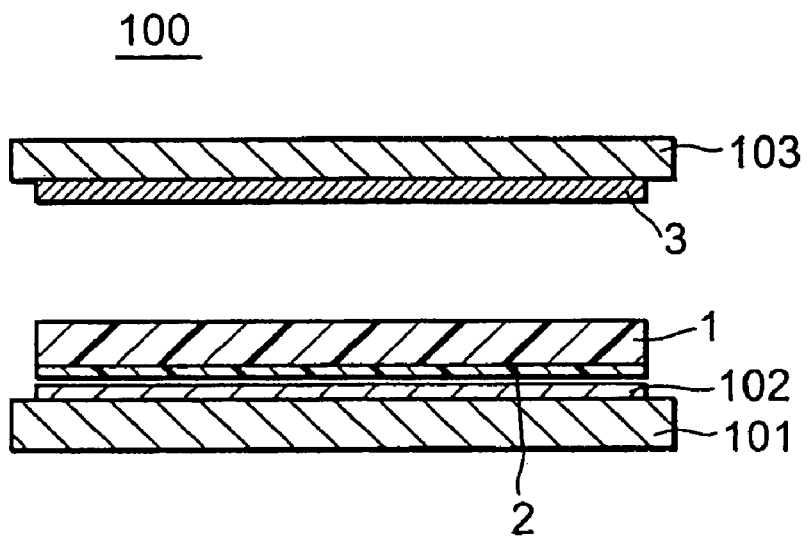
FIG. 3A is a side view illustrating how a liquid crystal display device is manufactured according to the invention in the order of process steps in a case where a liquid crystal display device employs a plastic substrate as one of two opposing substrates.

Then, as shown in FIG. 3A, the plastic substrate us transferred to a vacuum chamber 100 and placed on a lower plate 101 within the vacuum chamber 100. The lower plate 101 has a roughened plate 102, which is processed to have surface roughness, previously disposed thereon. Thereafter, the plastic substrate 1 is placed on the lower plate 101 so that the alignment film 2 contacts a roughened surface of the roughened plate 102 on the lower plate 101. Additionally, an upper plate 103 is disposed to face the lower plate 101 within the vacuum chamber 100 and a glass substrate 3 provided as a support substrate for the plastic substrate 1 and having a thickness of 0.5 mm to 1.0 mm is electrostatically attached to a surface, positioned on the side of the lower plate 101, of the upper plate 103. Thereafter, the vacuum chamber 100 is evacuated to a residual pressure of about $1 \times 10^{-1}$ Pa.

Figure 3B:
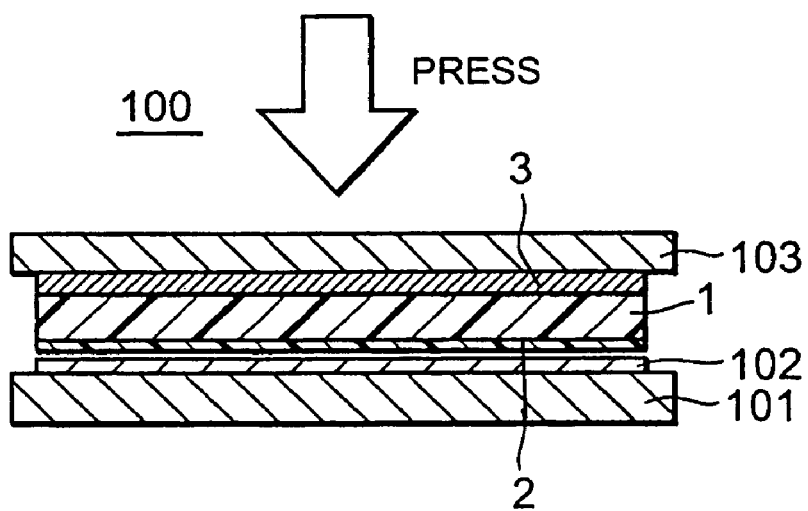
FIG. 3B is a side view illustrating the step subsequent to the step shown in FIG. 3A.

Under the aforementioned conditions, the upper plate 103 having the glass substrate 3 electrostatically attached thereto is brought down upon the lower plate 101 and made to press the plastic substrate 1 placed on the roughened plate 102 on the lower plate 101 against the lower plate 101, as shown in FIG. 3B.

Figure 4A:
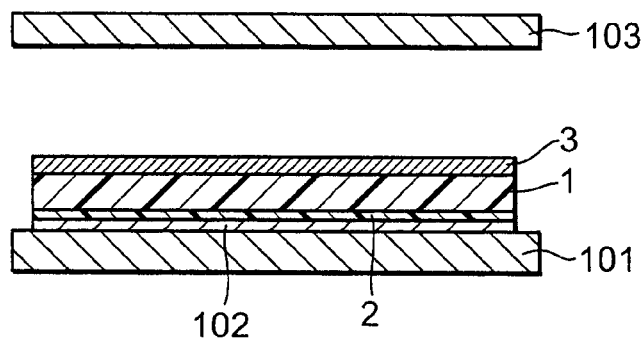
FIG. 4A is a side view illustrating the step subsequent to the step shown in FIG. 3B.

Subsequently, as shown in FIG. 4A, the vacuum conditions are broken and the components within the chamber are transferred into an external atmospheric pressure environment while the upper plate 103 is being pressed against the lower plate 101. Then, electrostatic charges on the upper plate 103 are neutralized and the upper plate 103 is lifted in a direction in which the upper plate 103 becomes apart from the lower plate 101, creating a situation in which the plastic substrate 1 is placed on the roughened plate 102 on the lower plate 101 while the glass substrate 3 is being pressed against and attached to a rear surface (a surface on which the alignment film is not formed) of the plastic substrate 1.

Figure 4B:
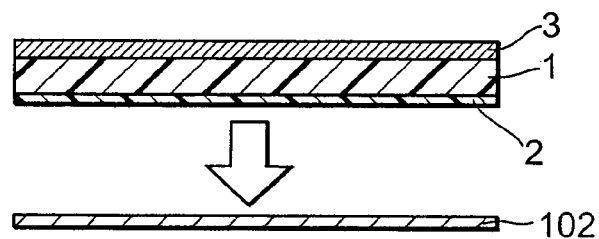
FIG. 4B is a side view illustrating the step subsequent to the step shown in FIG. 3A.

Under the aforementioned conditions, the plastic substrate 1 is peeled off from the roughened plate 102 as shown in FIG. 4B. In this case, the plastic substrate 1 can easily be removed from the roughened plate 102 making use of projections or depressions on the roughened surface of the roughened plate 102.

Figure 5A:
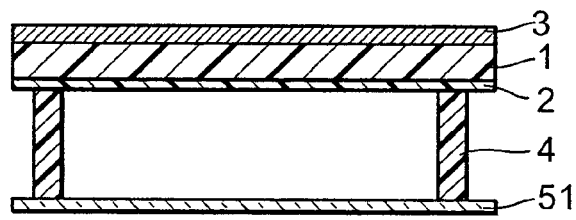
FIG. 5A is a side view illustrating the step subsequent to the step shown in FIG. 4B.

Thereafter, as shown in FIG. 5A, an adhesive sealing material 4 as a thermally curable adhesive is formed on a surface (on the side of the alignment film 2) of the plastic substrate 1, which is supported by the glass substrate 3, by screen printing techniques or dispensing techniques to have a specific pattern. The sealing material 4 preferably has an elastic modulus of not less than $1.5 \times 10^9$ Pa. Then, a TFT substrate 51 having spacers (not shown) dispersed on the surface thereof and the plastic substrate 1 supported by the glass substrate 3 are attached together along the edge with the adhesive sealing material 4. Subsequently, the two substrates are pressed against each other and heated for 1 to 2 hours at a temperature of 120–160°C., resulting in attachment to each other. In this case, the two substrates may be attached together through the sealing material 4 that is formed on a surface of the TFT substrate. Furthermore, when employing a UV-curable material as a sealing material, the plastic substrate is subjected to less thermal stress, further enhancing its flatness.

Figure 5B:
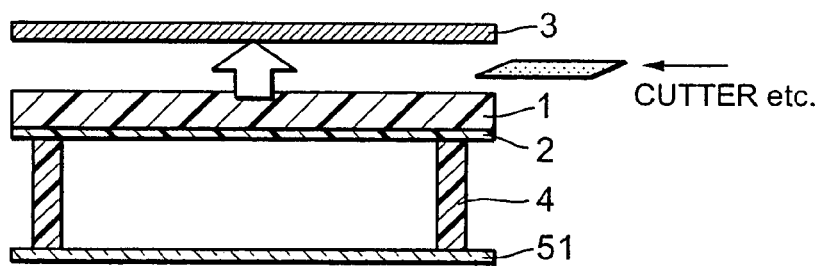
FIG. 5B is a side view illustrating the step subsequent to the step shown in FIG. 5A.

Thereafter, as shown in FIG. 5B, a thin strip 5 such as a cutter blade is inserted and threaded between the glass substrate 3 and the plastic substrate 1, allowing the glass substrate 3 and the plastic substrate 1 to be peeled off from each other. Then, a liquid crystal material is injected into a space between the plastic substrate 1 and the TFT substrate 51 via a liquid crystal injection port (not shown) under vacuum conditions, and the liquid crystal injection port is sealed with a sealant so as to provide a finished liquid crystal panel product.

The liquid crystal display device fabricated as described above has the following features.

First, the plastic substrate is attached to the support substrate under vacuum conditions and therefore, strongly and uniformly pressed against the support substrate as compared to the case where the plastic substrate is attached to the support substrate via an adhesive. This prevents the plastic substrate having a specific coefficient of linear expansion from thermally expanding or shrinking. Accordingly, the adhesive sealing material can be formed on the plastic substrate under the same conditions as those observed when the sealing material is formed on the glass substrate and further, the two substrates can be attached together to have a uniform cell gap therebetween.

Second, in this embodiment, the support substrate and the plastic substrate are directly attached together under vacuum conditions without interposing an adhesive therebetween. Since attachment surfaces of the support substrate and the plastic substrate are smooth, the two substrates can be attached together at the smooth attachment surfaces as a boundary under vacuum conditions. Accordingly, air does not remain between the support substrate and the plastic substrate. Furthermore, since the plastic substrate is configured to prevent formation of projections or depressions on its surface, the distance between the two substrates does not locally change, permitting uniformity in a cell gap between the TFT substrate and the plastic substrate.

Additionally, the plastic substrate is peeled off from the support substrate by threading the thin strip between the two substrates. Therefore, the peeling of the plastic substrate can be performed very easily, contributing to reducing the number of manufacturing steps.

When employing the method for manufacturing a liquid crystal display device according to the invention, the plastic substrate is attached to the support substrate under vacuum conditions and there is a lower probability of an air bubble being generated between the plastic substrate and the support substrate than in a case where the two substrates are attached together via an adhesive. In addition, the extent to which the plastic substrate is expanded or shrunk by heat generated when the sealing material is sintered is smaller than that observed when the plastic substrate attached to the support substrate via an adhesive that is expanded or shrunk. Accordingly, even after the plastic substrate and the TFT substrate are attached together along the edge with the sealing material, the plastic substrate is able to maintain its flatness and therefore, the two substrates are spaced a uniform distance apart from each other, i.e., fabricated to maintain a constant cell gap therebetween as desired.

What is claimed is:

1. A method for manufacturing a liquid crystal display device, comprising:
    attaching a first substrate and a support substrate by pressing said first substrate and a support substrate against each other under vacuum conditions without use of an adhesive;
    breaking said vacuum conditions and transferring said first substrate and said support substrate into an external atmospheric pressure environment while keeping said first substrate and said support substrate pressed against each other to attach said first substrate and said support substrate to each other;
    disposing said first substrate pressed against and attached to said support substrate and a second substrate so that said first substrate and said second substrate are aligned with each other while interposing a sealing material therebetween; and
    curing said sealing material to attach said first substrate and said second substrate to each other via said sealing material.

2. The method for manufacturing a liquid crystal display device according to claim 1, wherein a roughened plate with a rough surface is placed between said first substrate and said support substrate, and the step of pressing a first substrate and a support substrate against each other under vacuum conditions is performed by pressing said first substrate and said support substrate against each other so that a surface of an alignment film formed on said first substrate and the roughened surface of said roughened plate are disposed to face each other.

3. The method for manufacturing a liquid crystal display device according to claim 1, further comprising removing said support substrate from said first substrate after curing said sealing material to attach said first substrate and said second substrate to each other.

4. The method for manufacturing a liquid crystal display device according to claim 3, wherein removing said support substrate from said first substrate is performed by threading a thin strip between said first substrate and said support substrate.

5. The method for manufacturing a liquid crystal display device according to claim 3, further comprising injecting a liquid crystal material into a space enclosed by said first substrate, said second substrate and said sealing material after removing said support substrate from said first substrate.

6. A method for manufacturing a liquid crystal display device, comprising:
    pressing a first substrate and a support substrate against each other under vacuum conditions;
    breaking said vacuum conditions and transferring said first substrate and said support substrate into an external atmospheric pressure environment while keeping said first substrate and said support substrate being pressed against each other to attach said first substrate and said support substrate to each other;
    disposing said first substrate pressed against and attached to said support substrate and a second substrate so that said first substrate and said second substrate are aligned with each other while interposing a sealing material therebetween; and
    curing said sealing material to attach said first substrate and said second substrate to each other via said sealing material, wherein pressing a first substrate and a support substrate against each other under vacuum conditions is performed by pressing said first substrate and said support substrate against each other so that a surface of an alignment film formed on said first substrate and a roughened surface previously formed on a press tool are disposed to face each other.

7. A method for manufacturing a liquid crystal display device, comprising:
    pressing a first substrate and a support substrate against each other under vacuum conditions;
    breaking said vacuum conditions and transferring said first substrate and said support substrate into an external atmospheric pressure environment while keeping said first substrate and said support substrate being pressed against each other to attach said first substrate and said support substrate to each other;

disposing said first substrate pressed against and attached to said support substrate and a second substrate so that said first substrate and said second substrate are aligned with each other while interposing a sealing material therebetween;

curing said sealing material to attach said first substrate and said second substrate to each other via said sealing material; and removing said support substrate from said first substrate after curing said sealing material to attach said first substrate and said second substrate to each other.

8. The method for manufacturing a liquid crystal display device according to claim 7, wherein removing said support substrate from said first substrate is performed by threading a thin strip between said first substrate and said support substrate.

9. The method for manufacturing a liquid crystal display device according to claim 7, further comprising injecting a liquid crystal material into a space enclosed by said first substrate, said second substrate and said sealing material after removing said support substrate from said first substrate.

* * * * *